United States Patent [19]

Gordon

[11] Patent Number: 4,633,060

[45] Date of Patent: Dec. 30, 1986

[54] WELDING TORCH WITH ARC LIGHT REFLECTOR

[75] Inventor: Stephen S. Gordon, Tarzana, Calif.

[73] Assignee: The United States of America as represented by the Administrator of the National Aeronautics and Space Administration, Washington, D.C.

[21] Appl. No.: 783,890

[22] Filed: Oct. 3, 1985

[51] Int. Cl.$^4$ ............................................. B23K 9/10
[52] U.S. Cl. ........................... 219/130.01; 219/124.34
[58] Field of Search .................... 219/124.34, 130.01, 219/130.21; 350/600, 629, 630

[56] References Cited

U.S. PATENT DOCUMENTS 3,899,672  8/1975  Levi-Setti ............................ 350/630
4,488,032  12/1984  Case, Jr. et al. ................ 219/124.34

FOREIGN PATENT DOCUMENTS 51-2641  1/1976  Japan .............................. 219/130.01
274271  11/1970  U.S.S.R. .......................... 219/124.34

OTHER PUBLICATIONS

D. S. Goodman, "Hemispherical Reflector for Laser Processing", IBM Technical Disclosure Bulletin, vol. 27, No. 5, 10/1984, p. 3141.

Primary Examiner—Clifford C. Shaw
Attorney, Agent, or Firm—Joseph H. Beumer; John R. Manning; Leon D. Wofford, Jr.

[57] ABSTRACT

A conical shaped mirror (34) fits on the end of a welding torch (10) to reflect light from the arc (30) back onto the workpiece. The torch (10) has an internal coaxial viewing system consisting of a lens (12) which focuses the field of view of the weld scene of the workpiece onto the end (16) of a fiberoptic bundle (18). The transmitted image of the fiberoptic bundle (18) is provided to a camera lens (20) which focuses it onto a TV sensor array (23) for transmission. The reflected arc (30) light illuminates the dark areas of the weld area and thereby provides a more detailed image for the viewing system.

3 Claims, 2 Drawing Figures

WELDING TORCH WITH ARC LIGHT REFLECTOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 U.S.C. 2457).

TECHNICAL FIELD

This invention relates to a welding torch arc light reflector and shield, and more particularly, to an arc light reflector for enhancing the TV monitoring image of welds using a welding torch having a coaxial viewing system.

BACKGROUND ART

The most promising methods of providing real-time weld process sensors for weld tracking have utilized some variation of optical sensing. The emerging vision technologies have included a coaxial optical system which involves the placement of the primary imaging lens within the surrounding housing of the electrode such that the lens optical axis is aligned with the electrode. The field of view is limited to the exit diameter of the housing or gas cup surrounding the electrode. Usually a fiberoptic image bundle is utilized to optically transmit the image to a camera in a remote location. Thus, the camera electronics are in a location remote from the harsh welding environment.

The lack of uniformity of light in the welding area—the welding arc being too bright and surrounding welding area too dark—has proven to be detrimental in using through-the-torch viewing because of the difficulty in recognizing features in the image which have widely different brightness. One solution to this problem was having large, expensive, bright, quartz, halogen electric lights directed onto the weld area, but this solution has not worked well.

STATEMENT OF THE INVENTION

It has been found that by using a conical section shaped metal mirror attached to the end of the electrode housing or cup the bright arc light is reflected back onto the darker surrounding areas providing a more even light distribution and, thus, a clearer more detailed image for the monitoring system. Also such a metal mirror serves to shield the operator from the arc light, reducing the incidence of arc flash.

Accordingly, it is an object of the present invention to provide an arc light reflector for welding torches having optical viewing systems.

Another object is to provide a conical-section shaped mirror on the end of the electrode housing to reflect the arc light onto the welding area and to shield the operator from the arc light.

DETAILED DESCRIPTIONS OF THE INVENTION

Figures 1, 2:
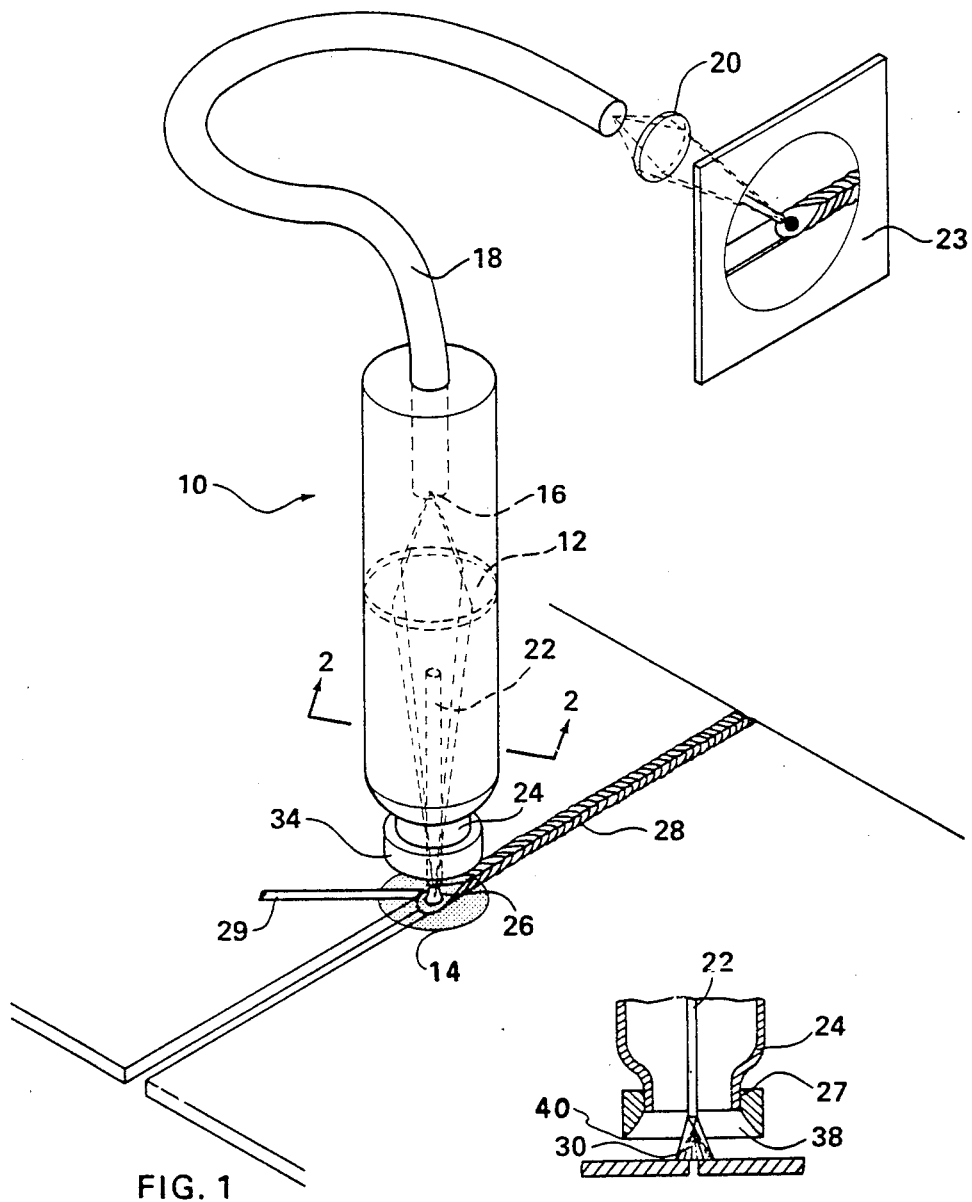
FIG. 1 is a schematic of a welding torch with a coaxial viewing system and an arc light reflector.
FIG. 2 is a sectional view taken along a line 2—2 of FIG. 1 showing in more detail the arc light reflector.

Referring to the drawings, FIG. 1 is a schematic of a welding torch 10 having an internal coaxial viewing system consisting of a lens 12 which focuses the field of view 14 of the weld scene of the workpiece onto the end 16 of the fiberoptic bundle 18. The transmitted image of the fiberoptic bundle 18 is provided to a camera lens 20 which focuses it onto a TV sensor array 23 for transmission. In this example, the welding torch 10 is the Gas-Tungsten-Arc (GTA) type and the internal lens 12 is above the electrode collet holder and aligned with the tungsten electrode 22. The field of view 14 is limited by the diameter of the gas cup 24 and in this example the view shows the weld pool 26 and the weld bead 28 and the cold feed wire 29. The scene is illuminated by the light from the arc 30. By extracting the location of the joint and weld pool edge features from a digitized TV image of the scene, the extracted information can be utilized to control the relative location of the joint, weld pool, size of the weld pool, and the cold wire feed rate.

To improve the clarity of the image of the monitoring system, an arc light reflector 34 is shown fitted to the end of the torch housing or gas cup 24. The arc light reflector 34 as shown best in FIG. 2 consists of a circular annular member with an upper circular opening portion 27 corresponding to the outer diameter of the end housing 24 and an internal conical section portion 38 which extends from the lower outer edge 40 of the member to the upper opening portion 27 surrounding the torch housing 24. The member 34 is made of stainless steel and the internal conical section portion 38 is polished so as to serve as a mirror which reflects the bright arc light back onto the darker areas of the weld area and thereby provide a more detailed image for the monitoring system.

The arc light reflector 34 is simple but makes use of the intense arc light that is already present in the normal process of arc welding to provide an excellent image for the monitoring system which can more easily be digitized. It is relatively non-intrusive and does not interfere with the addition of filler wire 29.

While the invention has been described relative to a specific embodiment, it is evident that modifications and changes may be made with regard thereto without departing from the scope of the invention.

What is claimed is:

1. In an electric arc welding torch having a housing with an internal optical viewing system for viewing the weld area, the improvement comprising:
    an annular member on the end of the torch housing adjacent the welding area,
    said annular member having an internal reflective surface coaxially with the end of the arc welding torch and extending outwardly therefrom for reflecting the arc light onto the welding area thereby providing a more even light distribution and a clearer image for the internal optical viewing system as well as to shield the operator of the welding torch from the arc light.

2. In an electric arc welding torch comprising an electrode coaxially extending from a housing and through a surrounding gas cup, said housing having an internal viewing system consisting of optics which focuses the weld scene of the electrode arc onto an image transmission means, the improvement comprising:

an arc light reflector with an upper circular opening portion fitted onto the end portion of said gas cup,
said arc light reflector having an internal generally conical section portion extending outwardly from the upper circular opening portion to its lower edge,
said internal generally conical section portion being highly reflective so as to serve as a mirror which reflects the bright arc light back onto the darker areas of the weld area and thereby provide a more detailed image for the internal viewing system.

3. An electric arc welding torch according to claim 2, further comprising:
said arc light reflector is made of stainless steel.

* * * * *